US012242586B2

(12) United States Patent
Roy (10) Patent No.: US 12,242,586 B2
(45) Date of Patent: Mar. 4, 2025

(54) USB-BASED AUTHENTICATION DEVICE

(71) Applicant: MOZARC MEDICAL US LLC, Minneapolis, MN (US)

(72) Inventor: Arindam Ghosh Roy, Bangalore (IN)

(73) Assignee: MOZARC MEDICAL US LLC, Minneapolis, MN (US)

( * ) Notice: Subject to any disclaimer, the term of this patent is extended or adjusted under 35 U.S.C. 154(b) by 240 days.

(21) Appl. No.: 17/152,549

(22) Filed: Jan. 19, 2021

(65) Prior Publication Data
US 2022/0229894 A1  Jul. 21, 2022

(51) Int. Cl.
G06F 21/34 (2013.01)
G06F 13/42 (2006.01)
H04L 9/08 (2006.01)
H04L 9/32 (2006.01)

(52) U.S. Cl.
CPC .......... *G06F 21/34* (2013.01); *G06F 13/4282* (2013.01); *H04L 9/0877* (2013.01); *H04L 9/3213* (2013.01); *G06F 2213/0042* (2013.01)

(58) Field of Classification Search
CPC .................. G06F 21/123; G06F 21/34; G06F 2221/2141; G06F 13/4282; G06F 2213/0042; H04L 9/0877; H04L 9/3213; H04L 9/3234; H04L 63/0876
See application file for complete search history.

(56) References Cited

U.S. PATENT DOCUMENTS

| 8,839,451 | B1* | 9/2014 | Lam | G06F 21/10 713/193 |
| 10,122,756 | B1* | 11/2018 | Kelly | G06Q 20/3274 |
| 11,301,554 | B2* | 4/2022 | Law | G06F 21/34 |
| 2006/0280297 | A1* | 12/2006 | Fukaya | H04L 9/0833 380/28 |
| 2009/0106551 | A1* | 4/2009 | Boren | H04L 9/321 380/259 |
| 2010/0046748 | A1* | 2/2010 | Kusnoto | G06F 21/6209 380/42 |
| 2011/0119155 | A1* | 5/2011 | Hammad | G06Q 20/42 235/382 |
| 2013/0227286 | A1* | 8/2013 | Brisson | H04L 63/062 713/168 |
| 2014/0282895 | A1* | 9/2014 | Stuntebeck | H04L 63/0853 726/4 |
| 2016/0262717 | A1* | 9/2016 | Smith | A61B 5/0022 |
| 2018/0183778 | A1* | 6/2018 | Bettenburg | G06K 7/1417 |
| 2019/0081791 | A1* | 3/2019 | van der Maas | G06F 21/602 |
| 2019/0116179 | A1* | 4/2019 | Xu | H04L 9/3226 |

* cited by examiner

*Primary Examiner* — Luu T Pham
*Assistant Examiner* — Paul J Skwierawski (57) ABSTRACT

The disclosure relates to systems, devices, and methods for authenticating users of any device requiring authentication, such as a medical device. The systems, devices, and methods can convert a standard USB mass storage device into a unique USB based authentication device that authenticates a user. The device can be programmed to grant access to one or more functions only upon verification of a user by inserting the USB based authentication device into the medical device.

18 Claims, 5 Drawing Sheets

USB-BASED AUTHENTICATION DEVICE

FIELD

The disclosure relates to systems, devices, and methods for authenticating users of a device such as a medical device, consumer electronics such as a printer, refrigerator, or television, or any other device that may require authentication. The systems, devices, and methods can convert a standard USB mass storage device into a unique USB based authentication device that authenticates a user or other device. The device can be programmed to grant access to one or more functions only upon verification of a user by inserting the USB based authentication device into the device.

BACKGROUND

Certain devices have specific modes of operation that should be restricted from certain parties that may otherwise have access to the device. For example, certain information stored on medical devices, machinery, or consumer electronics may be restricted for privacy or technical reasons. Service technicians may require access to a medical device or machine while also being prevented from accessing private health information. For safety and therapeutic reasons, devices may restrict access to treatment or service modes from unauthorized users or restrict the ability to make changes to data such as a patient prescription while allowing service technicians to otherwise access the machine. Industrial machinery or automobiles may restrict certain service modes of operation to ensure only authorized servicers can make changes to the devices. Similarly, electronics such as multi-function printers, smart refrigerators, smart phones or other consumer electronics can include restricted modes of operation that can only be accessed by authorized users and/or access only certain data. However, the ability to implement fine control over access to one or more restricted modes of operation is sometimes lacking using known methods and systems. Often, the known systems and methods rely on usernames and passwords to control access to data and operate the devices. However, usernames and passwords can be lost, forgotten, or discovered by parties that should not have access to the restricted modes of operation or data. Further, passwords and other types of logins may not be possible for devices that are not network connected. The known methods also cannot convert standard and widely available components such as USB mass storage devices into a robust authentication device. The known methods rely on specific or custom components such as a token or fob that must be provisioned for a specific user and cannot be generated on the fly. The known methods fail to provide a possession-based authentication system based on commonly available components such as USB mass storage device that can act as a key to unlock restricted modes of operation of a particular machine or device.

Hence, there is a need for an authentication system that ensures only authorized parties can access certain modes of operation of a device such as a medical device. The need extends to any device, component, or access to software stored on hardware that requires authentication such as a machine, device, and in particular a medical device, computers, electronic components, hardware of any type, servers, and software stored on a physical device or hardware. The need extends to devices that are not network connected. The need extends to implementing a service mode for any type of machinery. The need extends to implementing a service mode for industrial machinery. The need extends to implementing a service mode for consumer electronics such as printers, refrigerators, televisions, and the like. There is a need for a possession-based authentication system that can act as a key to unlock restricted modes of operation of a particular machine or device, such as a medical device that cannot be forgotten or discovered by third parties. Further, the need can extend to any type of machine that requires authentication to access the device. The need extends to systems and methods that can convert standard USB mass storage devices into authentication devices. The USB based authentication devices should be secure with the key file that unlocks the restricted modes of operation opaque to any users. There is further a need for a possession-based authentication system that does not require any maintenance.

SUMMARY OF THE INVENTION

The first aspect of the invention relates to a method performed by a processor of a client computer. In any embodiment, the method can include the steps of communicating one or more USB identification characteristics from a USB device in communication with the processor to a key generation server; receiving a unique USB key file from the key generation server by the processor; wherein the key file is generated using the USB identification characteristics; and saving the unique USB key file on the USB device.

In any embodiment, the communication between the processor and the key generation server can be through a secure channel.

In any embodiment, the key generation server can execute an algorithm to generate the key file from the USB identification characteristics.

In any embodiment, the USB identification characteristics can include one or more of a vendor ID, a product ID, and a serial number of the USB device.

In any embodiment, the method can include receiving a token from the USB device or a user, and only communicating the identification characteristics if the token is valid.

In any embodiment, the method can include receiving user identification information, and communicating the user identification information to the key generation server; wherein the key generation server associates the user identification information with the USB identification characteristics.

In any embodiment, the method can include receiving blacklisted device information from the key generation server and determining whether the USB device is a blacklisted device.

In any embodiment, the processor can be programmed to not authenticate a USB device if the USB device is a blacklisted device.

The features disclosed as being part of the first aspect of the invention can be in the first aspect of the invention, either alone or in combination, or follow any arrangement or permutation of any one or more of the described elements. Similarly, any features disclosed as being part of the first aspect of the invention can be in a second, third, fourth, or fifth aspect of the invention described below, either alone or in combination, or follow any arrangement or permutation of any one or more of the described elements.

The second aspect of the invention relates to a system. In any embodiment, the system can include a client computer having a processor programmed to communicate with a key generation server; the client computer including an input for a USB device; the processor programmed to: determine one or more identification characteristics from the USB device; communicate the one or more identification characteristic to the key generation server; receive a key file from the key generation server; and save the key file on the USB device.

In any embodiment, the system can include a medical device; the medical device having a processor programmed to authenticate the USB device by: determining the USB identification characteristics; executing the algorithm to generate a second key file; comparing the second key file to the key file stored on the USB device; and authenticating the USB device if the second key file and the key file stored on the USB device match.

In any embodiment, the processor of the medical device can be programmed to grant access to a restricted mode of operation of the medical device if the USB device is authenticated.

In any embodiment, the identification characteristics can include one or more of a vendor ID, a product ID, and a serial number of the USB device.

In any embodiment, the processor of the client computer can be programmed to receive user identification information, and communicating the user identification information to the key generation server.

In any embodiment, the processor of the medical device can be programmed to receive blacklisted device information from the key generation server; and wherein the processor is programmed not to authenticate the USB device if the USB device is a blacklisted device.

The features disclosed as being part of the second aspect of the invention can be in the second aspect of the invention, either alone or in combination, or follow any arrangement or permutation of any one or more of the described elements. Similarly, any features disclosed as being part of the second aspect of the invention can be in the first, third, fourth, or fifth aspect of the invention described below, either alone or in combination, or follow any arrangement or permutation of any one or more of the described elements.

The third aspect of the invention relates to a system. In any embodiment, the system can include a client computer having a processor programmed to communicate with a key generation server; the client computer having an input for a USB device; the processor of the client computer programmed to: i) determine one or more USB identification characteristics from the USB device; ii) communicate the one or more identification characteristic to the key generation server; iii) receive a key file from the key generation server; wherein the key file has an encrypted form of the one or more USB identification characteristics; and iv) save the key file on the USB device. The system can also include a medical device having a processor programmed to authenticate the USB device by: i) decrypting the key file to generate one or more USB identification characteristics; ii) comparing the one or more USB identification characteristics generated by decrypting the key file with the one or more USB identification characteristics from the USB device; and authenticating the USB device if the one or more USB identification characteristics generated by decrypting the key file match the one or more USB characteristics from the USB device.

In any embodiment, the processor of the medical device can be programmed to grant access to a restricted mode of operation of the medical device if the USB device is authenticated.

In any embodiment, the USB identification characteristics can include one or more of a vendor ID, a product ID, and a serial number of the USB device.

The features disclosed as being part of the third aspect of the invention can be in the third aspect of the invention, either alone or in combination, or follow any arrangement or permutation of any one or more of the described elements. Similarly, any features disclosed as being part of the third aspect of the invention can be in the first, second, fourth, or fifth aspect of the invention, either alone or in combination, or follow any arrangement or permutation of any one or more of the described elements.

The fourth aspect of the invention relates to a system. In any embodiment, the system can include a key generation server; the key generation server programmed to: receive USB identification characteristics from a client computer in communication with a first USB device; execute an algorithm using the USB identification characteristics to generate a key file; and communicate the key file to the client computer.

In any embodiment, the key generation server can be programmed to receive user identification information from the client computer and to associate the user identification information with the USB identification characteristics.

In any embodiment, the key generation server can be programmed to determine whether the user identification information is associated with USB identification characteristics of a second USB device.

In any embodiment, if the user identification is associated with USB identification characteristics of the second USB device, the key generation server can be programmed to add the second USB device to a blacklist and to communicate the blacklist to the client computer.

In any embodiment, the key generation server can be programmed to receive USB identification characteristics from at least a second USB device from at least a second client computer; to generate a key file for the second USB device; and to communicate the key file to the second client computer.

In any embodiment, the USB identification characteristics can include one or more of a vendor ID, a product ID, and a serial number of the USB device.

The features disclosed as being part of the fourth aspect of the invention can be in the fourth aspect of the invention, either alone or in combination, or follow any arrangement or permutation of any one or more of the described elements. Similarly, any features disclosed as being part of the fourth aspect of the invention can be in the first, second, third, or fifth aspect of the invention, either alone or in combination, or follow any arrangement or permutation of any one or more of the described elements.

The fifth aspect of the invention is drawn to a system. In any embodiment, the system can include a client computer having a processor programmed to communicate with a key generation server; the client computer having an input for a USB device; the processor programmed to: i) determine one or more USB identification characteristics from the USB device; ii) communicate the one or more identification characteristic to the key generation server; iii) receive a key file from the key generation server; and iv) save the key file on the USB device.

In any embodiment, the system can include a device having a processor programmed to authenticate the USB device by: determining the USB identification characteristics; executing an algorithm to generate a second key file; comparing the second key file to the key file stored on the USB device; and authenticating the USB device if the second key file and the key file stored on the USB device match.

In any embodiment, the system can include a device having a processor programmed to authenticate the USB device by: decrypting the key file to generate one or more USB identification characteristics; comparing the one or more USB identification characteristics generated by the device with the one or more USB identification characteristics from the USB device; and authenticating the USB device if the one or more USB identification characteristics generated by the device match the one or more USB characteristics from the USB device.

In any embodiment, the processor of the device can be programmed to grant access to a restricted mode of operation of the device if the USB device is authenticated.

In any embodiment, the USB identification characteristics can include one or more of a vendor ID, a product ID, and a serial number of the USB device.

In any embodiment, the processor of the client computer can be programmed to receive user identification information, and communicate the user identification information to the key generation server.

In any embodiment, the processor of the device can be programmed to receive blacklisted device information from the key generation server; and the processor can be programmed not to authenticate the USB device if the USB device is a blacklisted device.

The features disclosed as being part of the fifth aspect of the invention can be in the fifth aspect of the invention, either alone or in combination, or follow any arrangement or permutation of any one or more of the described elements. Similarly, any features disclosed as being part of the fifth aspect of the invention can be in the first, second, third, or fourth aspect of the invention, either alone or in combination, or follow any arrangement or permutation of any one or more of the described elements.

DETAILED DESCRIPTION

Unless defined otherwise, all technical and scientific terms used have the same meaning as commonly understood by one of ordinary skill in the art.

The articles "a" and "an" are used to refer to one to over one (i.e., to at least one) of the grammatical object of the article. For example, "an element" means one element or over one element.

The term "algorithm" can refer to the broadest interpretation of a process, mathematical operation, or method of any type that can be used to generate data, files, parameters, passwords, text, or information.

To "associate" means to identify one piece of information as related to a second piece of information.

The term "authenticated" or to "authenticate" refer to a device that grants the user the ability to perform one or more restricted functions.

The term "blacklisted device" or to "blacklist a device" refer to a device that cannot be used as an authentication device even if the device has a correct key file.

The term "client computer" refers to any computer programmed to, or running software for, creating an authentication device from a USB device. The term "client computer" is not meant to refer to any party having ownership or control over the computer or software.

The terms "communication," "communicate," "communicating," and the like can refer to the ability to transmit electronic data, instructions, information wirelessly, via direct electrical connection, or any other electrical transmission means between one or more components.

The term "compare" means to determine whether two files or data are the same or different.

The term "comprising" includes, but is not limited to, whatever follows the word "comprising." Use of the term indicates the listed elements are required or mandatory but that other elements are optional and may be present.

The term "consisting of" includes and is limited to whatever follows the phrase "consisting of." The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The terms "decrypt" or "decrypted" refer to the process of converted encrypted values or characters back into the original values or characters prior to encryption.

The term "device," as used herein, refers to any device that can authenticate a user or USB authentication device.

The term "determining" or to "determine" refers to ascertaining a particular state of a component or system.

The term "device" is to be interpreted in the broadest and can include anything made for a particular purpose; a contrivance of any type, particularly a mechanical or electrical component or hardware. Some examples of devices can include a medical device such as a dialysis machine, laptop, computer, computer peripherals of any type, computer terminals, portable devices, smart phones, and smart watches.

The terms "encrypt" or "encrypted" refer to a values or characters that have been converted to different values or characters according to an algorithm.

The term "execute" means to perform a step or series of steps.

The term "generate" means to create a file or information in electronic form.

To "grant access" means to allow a user to perform some function using a computer.

The term "input" refers to a port on a computer through which a peripheral device can be attached.

The term "key file" refers to a file containing information used for authentication of a device.

The term "key generation server" refers to any server or computer programmed to generate a key file that uniquely identifies a component.

The term "match" refers to two files that are identical.

The term "medical device" refers to a device used to perform medical treatment or diagnosis of any type.

The term "processor" or "microprocessor" as used is a broad term and is to be given an ordinary and customary meaning to a person of ordinary skill in the art. The term refers without limitation to a computer system, state machine, processor, or the like designed to perform arithmetic or logic operations using logic circuitry that responds to and processes the basic instructions that drive a computer. In any embodiment of the first, second, third, and fourth invention, the terms can include ROM ("read-only memory") and/or RAM ("random-access memory") associated therewith.

The term "product ID" refers to a series of characters that uniquely identify each component in a system.

The term "programmed," when referring to a processor, can mean a series of instructions that cause a processor to perform certain steps.

The term "receiving" refers to the process of obtaining electronic information by any means.

A "restricted mode of operation" refers to a function or set of actions that can only be accessed or performed by specific users.

The term "save" or "saving" refers to storing information in a memory of any type. Often, the data can be stored in memory positioned within a device.

A "secure channel" is a mode of communication between two or more components that is resistant to tampering or eavesdropping.

A "serial number" is a series of characters that identify the position of a component in a series.

The term "token" refers to information containing security credentials necessary to perform a function.

The term "unique USB key file" refers to a file containing values that identify a single USB device.

The term "user identification information" refers to information that identifies a particular user of a system. The user identification information can include a user name and password or any other information that identifies the particular user.

A "USB device" is a peripheral device that can connect to an input of a computer via a port. The USB device can include a memory for storing information.

The term "USB identification characteristic" refers to any characteristic or value or set of characteristics or values unique to a specific USB device.

The term "vendor ID" refers to a series of characters that identify a component and the source of the component.

USB Authentication Device

Figure 1:
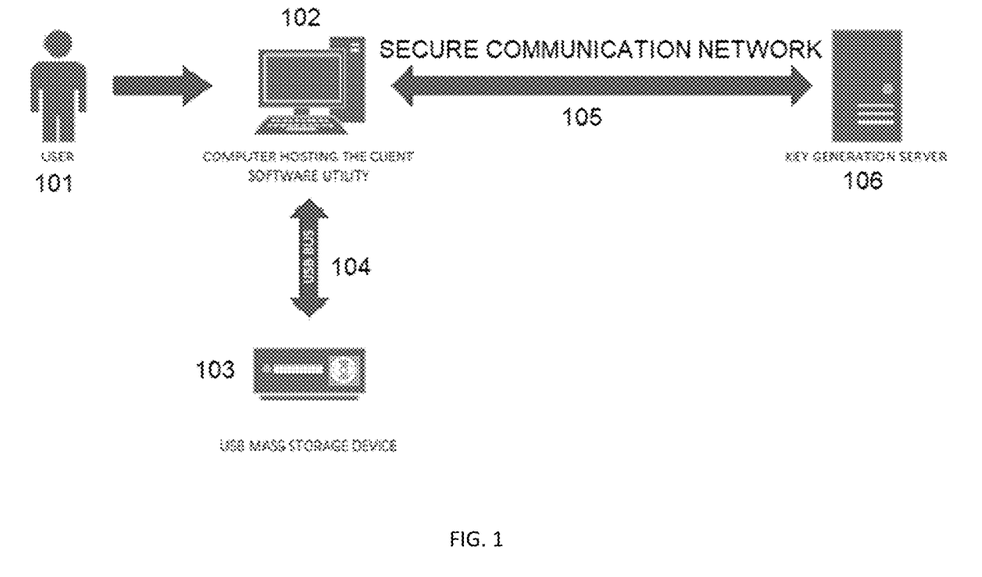
FIG. 1 is a diagram of a system for creating a USB based authentication device.

FIG. 1 illustrates components that can be used to generate a USB authentication device. A user 101 can connect a client computer 102 to a USB device 103 using USB bus 104. The client computer 102 is a computer hosting a client software utility can receive certain identification characteristics from the USB device 103. As described, the USB identification characteristics can include any identification characteristics that are unique to the USB device 103 and do not change. For example, the USB identification characteristics can include a vendor ID, a product ID, and a serial number of the USB device. The USB identification characteristics are received by a processor of the client computer 102 and communicated to a key generation server 106 via a secure communication network 105. The key generation server 106 uses the USB identification characteristics of the USB device 103 in an algorithm to generate a unique USB key file for the USB device 103. Because the algorithm used to generate the key file uses the unique USB identification characteristics of the USB device 103, any USB device used will result in a different key file.

The key generation server 106 communicates the key file back over the secure communication network 105 to the client computer 102. The processor of client computer 102 can be programmed to save the key file on the USB device 103. The USB device 103 now contains a unique USB key file that can be used for authentication.

In certain embodiments, the client computer 102 can also receive user identification information from user 101. The user identification information can be communicated to the key generation server 106 and associated by the key generation server 106 with the USB identification characteristics. A list of USB devices and associated users can be maintained by the key generation server 106 to ensure that a single user is not associated with multiple USB authentication devices. As described, in certain embodiments, the key generation server 106 can maintain a device or user blacklist that will not allow authentication of certain blacklisted devices or users. In certain embodiments, the client computer 102 can be part of a device. The device can be made for a particular purpose such as mechanical or electrical component that can serve any purpose. Alternatively, client computer 102 can be a computer that is not a part of a device, the system including a separate device for which the USB device 103 is being authenticated.

Figure 2:
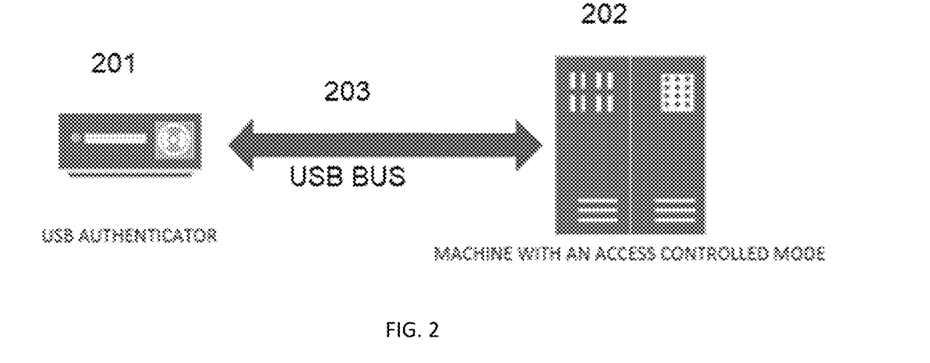
FIG. 2 is a diagram of a system for using a USB based authentication device.

FIG. 2 illustrates use of a USB authentication device. A USB device 201 containing a key file can be inserted into an input of a device 202 having a processor. In one embodiment, the device 202 is a medical device. However, numerous types of devices are contemplated including any device, component, or computer that authenticates and or provides access to other midpoints and/or endpoints, online or offline. For example, the device 202 can be a multi-function printer consumer electronics such as a smart refrigerator or television, industrial machinery, automobiles, or any other device that may have one or more restricted modes of operation. The devices of the invention may or may not require an operating system. The devices, systems, and method of the invention are not limited to any specific software and/or hardware, and may include and authenticate any entity such as users, other devices, applications, services, servers, software, and the like. The USB device 201 can communicate with the processor of the device 202 through USB bus 203. The device processor can obtain the same USB identification characteristics as used for the key generation. The device processor can then use the same algorithm as the key generation server to regenerate the unique USB key file internally. The device processor can compare the generated USB key file to the key file saved on the USB device 201. If the key files match, the USB device 201 is authenticated. If the key files do not match, the USB device 201 is not authenticated.

The device 202 can have at least one mode of operation to which access is controlled using the authentication system described. As a non-limiting example, the device 202 can be a medical device, such as a dialysis system. If used as a medical device, the device 202 can be programmed so that a therapy such as a dialysis therapy does not begin until an authenticated USB device is inserted. However, the device 202 need not be a medical device. In non-medical devices, the restricted modes of operation may include certain functions that may expose private information of an owner or user, or service modes of automobiles or industrial machinery. Once the USB device is authenticated, the system can grant access to the restricted modes of operation. If used as any other type of device or mechanical or electrical component, the device 202 can be used to authenticate an entity requiring access to the device 202. The entity can be users, other devices, applications, services, servers, software, and the like. In certain embodiments, the device 202 can be isolated from the internet for security purposes. The authentication system described ensures that only authorized users can access the restricted modes of operation.

Creation of the Authentication Device

Figure 3:
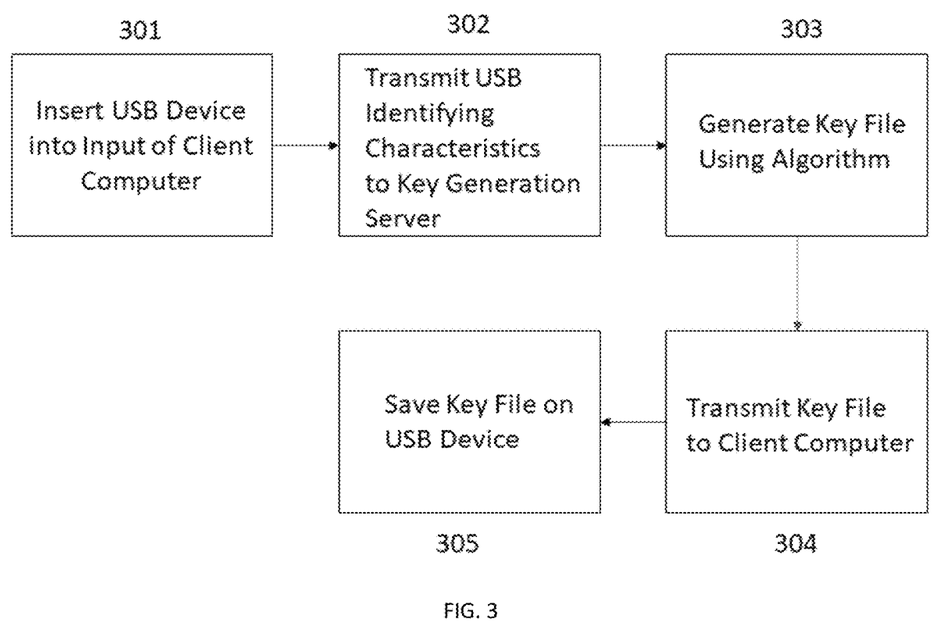
FIG. 3 is a flow chart showing steps for creating a USB based authentication device.

FIG. 3 is a flow chart illustrating steps used to create a USB authentication device from a standard USB mass storage device. In step 301, a user inserts a USB device into a client computer. The client computer is a computer programmed to run a client software utility. The client computer can communicate with a key generation server over a network. The client software utility acts as a front end of the USB authenticator. The client software utility and the key generation server may be part of the same enterprise network. In certain embodiments, the connection to the enterprise network may be through Virtual Private Network. The client software utility may be a command line utility or a graphical user interface-based utility. In certain embodiments, the client computer can authenticate the user using a local machine-based authentication mechanism, such as a username and password. Alternatively, the client computer can authenticate the user using a network-based authentication mechanism, such as signing on to a network. In certain embodiments, the client computer can require a token from the user. If the token is valid, the client computer can authenticate the user. When using a network-based authentication method, the client computer hosting the client software utility can be connected to an enterprise network which enables the authentication of user. The client software utility may require the user to be authenticated prior to creation of the USB authentication device.

Once the user is authenticated and the USB device inserted into the client computer, the client computer can obtain certain USB identification characteristics. As described, the USB identification characteristics can include one or more of a vendor ID, a product ID, and a serial number of the USB device. Any information that can uniquely identify a USB device can be used as a USB identification characteristic. In step 302, the client computer can transmit the USB identification characteristics to a key generation server over a secure network. In certain embodiments, the client computer may authenticate the key generation server before sending any data to the key generation server. The client computer can optionally also send login details, such as the user's username and time of request, or other user identification information that can uniquely identify a user, to the key generation server. If the user identification information shows that the user already has an authenticated USB device, the previously authenticated USB device can be blacklisted, so that each and every authentication device created can be uniquely attributed to a user. In step 303, the key generation server can generate a key file using the USB identification characteristics. The USB identification characteristics are used as inputs to an algorithm to generate a key file unique to the specific USB device. In step 304, the client computer receives the key file from the key generation server. In step 305, the client computer saves the key file on the USB device. The USB device can now be used as an authentication device. In certain embodiments, the client computer can format the key file and USB device to avoid the key file mounting on an operating system. The client computer can format the USB device as a specific partition, for example FAT32. The client computer can check the partition table on the USB device to determine the starting logical block for the partition. The key file can be copied to the start of the partition, then the partition resized so that the starting logical block address of the partition shifts to a location just after the key file, placing the key file outside of the formatted partition of the USB device. Because the key file is not part of any partition, the key file will not be mounted by any operating system. In certain embodiments, the USB device can still be used as a mass storage device in addition to being an authentication device. The user can format the partition that is still visible to the user without affecting the key file and with no apparent change in size of the USB device.

In certain embodiments, the key generation server can generate and transmit to the client computer a key rather than a key file. In such embodiments, the client computer can be programmed to generate the actual key file and save the key file on the USB device.

Usage of USB Authentication Device

Figure 4:
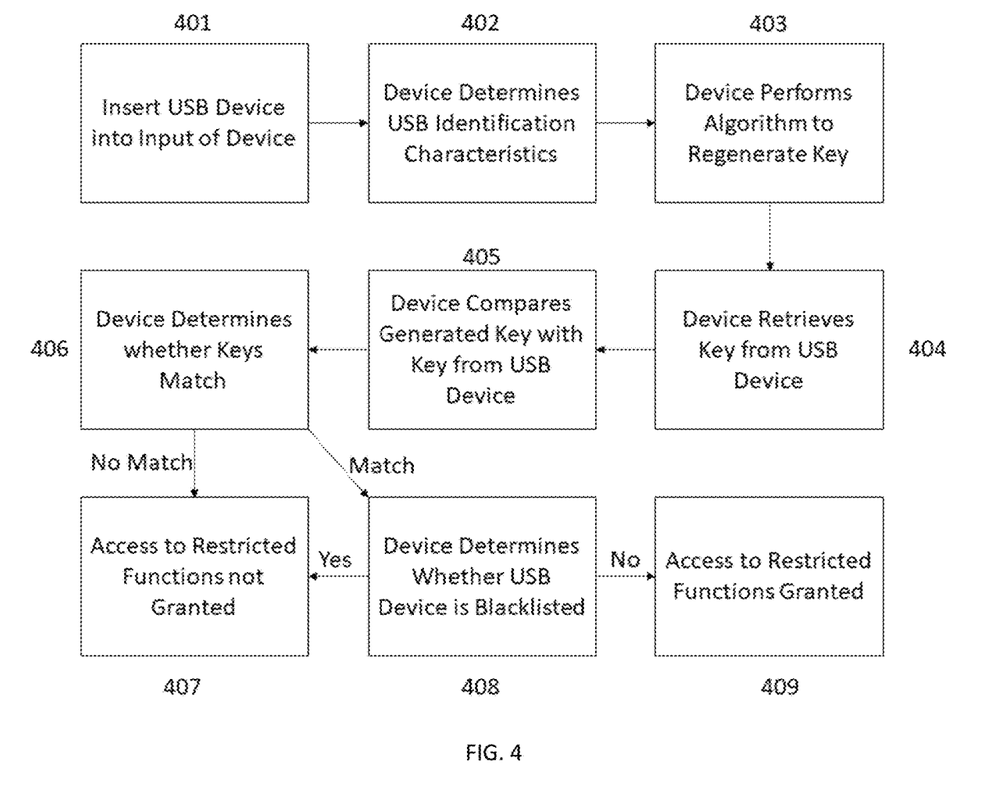
FIG. 4 is a flow chart showing steps for using a USB based authentication device.

FIG. 4 is a flow chart showing a USB authentication device used with a device in a non-limiting embodiment. If the device is a medical device, the devices can be a dialysis machine of any type performing any therapy such as hemodialysis, hemofiltration, hemodiafiltration, and peritoneal dialysis, and any computer, peripheral devices such as sorbent cartridge recharges, peritoneal dialysis cyclers, and the like. The medical devices can be any type that requires authentication. For example, any device having a computer, process, electrical component, or data that requires authentication such as those in the fields of chemistry and toxicology devices, hematology and pathology devices, immunology and microbiology devices, anesthesiology devices, cardiovascular devices, dental devices, ear, nose, and throat devices, gastroenterology-urology devices, general and plastic surgery devices, general hospital and personal use devices, neurological devices, obstetrical and gynecological devices, ophthalmic devices, orthopedic devices, physical devices, and radiology devices. As described, the devices need not be medical devices. The device can be any device having a restricted mode of operation.

In step 401, the user can insert the USB authentication device having a stored key file into an input of a device have one or more restricted modes of operation. The device may have one or more operating states where the USB authentication device can provide a specified level of access to the one or more operating states. For example, the USB authentication device can provide access to electronic, computers, or processers on the device. The USB authentication device can also provide access to a database server on the device or access to computer logic or processes which then can obtain data such as electronic medical records, prescriptions, maintenance and management of the device, one or more third party servers, user authentication data for managing user accounts, passwords, user authentication and authorization, a server configured to facilitate communication with other software systems, a server configured to manage display updates and reports of calls and notifications and/or generate printed reports, procedures or standards that apply to a healthcare facility, a locating and tracking server configured to manage the locating and tracking of peripheral devices and components such as sorbent cartridge and sorbent cartridge rechargers, or a text managing server configured to manage or facilitate the communication of messages within a system.

In step 402, the processor of the device can obtain the USB identification characteristics from the USB device that were used to generate the key file stored on the USB device. In step 403, the processor of the device can perform the same algorithm used to generate the key file, regenerating the key file. In step 404, the processor of the device can retrieve the key stored on the USB device. In step 405, the processor of the device can compare the regenerated key to the key stored on the USB device. In step 406, the processor of the device can determine whether the keys match. If the keys do not match, access to the restricted functions can be denied in step 407. Because the device obtains the identification characteristics from the USB device, the device can generate a different key value for any USB device. As such, even if a key file from one USB device is copied onto another USB device, the second device will not function as an authentication device because the copied key file will not match the key file generated by the device. If the keys match, the processor of the device can determine whether the USB device is a blacklisted device in step 408. If the authenticated device is a blacklisted device, access to the restricted functions can be denied in step 407. If the USB device is authenticated and not blacklisted, access to the restricted functions can be granted in step 409. In any embodiment, if access is denied in step 407, the device can display the reason why access is not granted. The owner of the device or administrator of the system can also be notified if an attempt to use an unauthenticated or blacklisted USB device is made. Although described in terms of a medical device, one of ordinary skill will understand that the invention can be applied to many settings outside of healthcare. For example, other settings where a device can be authenticated include a factory floor, at home or office, in an automobile or vehicle of any type, and the use of a personal device.

Figure 5:
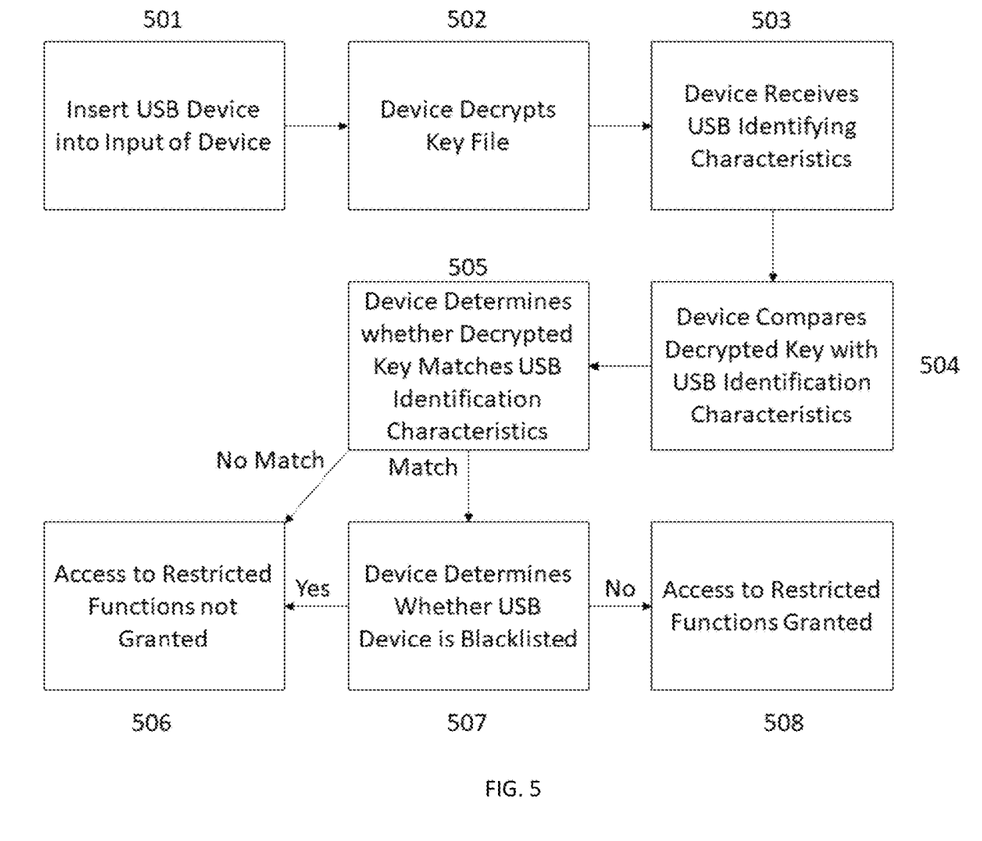
FIG. 5 is a flow chart showing steps for authenticating a USB device by decrypting the key file.

FIG. 5 is a flow chart illustrating an alternative method of using a USB authentication device. In step 501, the user can insert the USB authentication device having a stored key file into an input of a device have one or more restricted modes of operation. As described, the key file includes one or more USB identification characteristics that have been encrypted. In step 502, the device can decrypt the key file to generate the USB identification characteristics. In step 503, the device can receive one or more USB identification characteristics directly from the USB device.

In step 504, the device can compare the USB identification characteristics obtained by decrypting the key file with the USB identification characteristics received directly from the USB device. The device can determine whether the USB identification characteristics match in step 505. If the keys do not match, access to the restricted functions can be denied in step 506. Similar to the method illustrated in FIG. 4, even if a key file from one USB device is copied onto another USB device, the second device will not function as an authentication device because the USB identification characteristics generated by decrypting the key file will not match the USB identification characteristics obtained directly from the second USB device. If the keys match, the processor of the device can determine whether the USB device is a blacklisted device in step 507. If the authenticated device is a blacklisted device, access to the restricted functions can be denied in step 506. If the USB device is authenticated and not blacklisted, access to the restricted functions can be granted in step 508.

Blacklisting of USB Device

Figure 6:
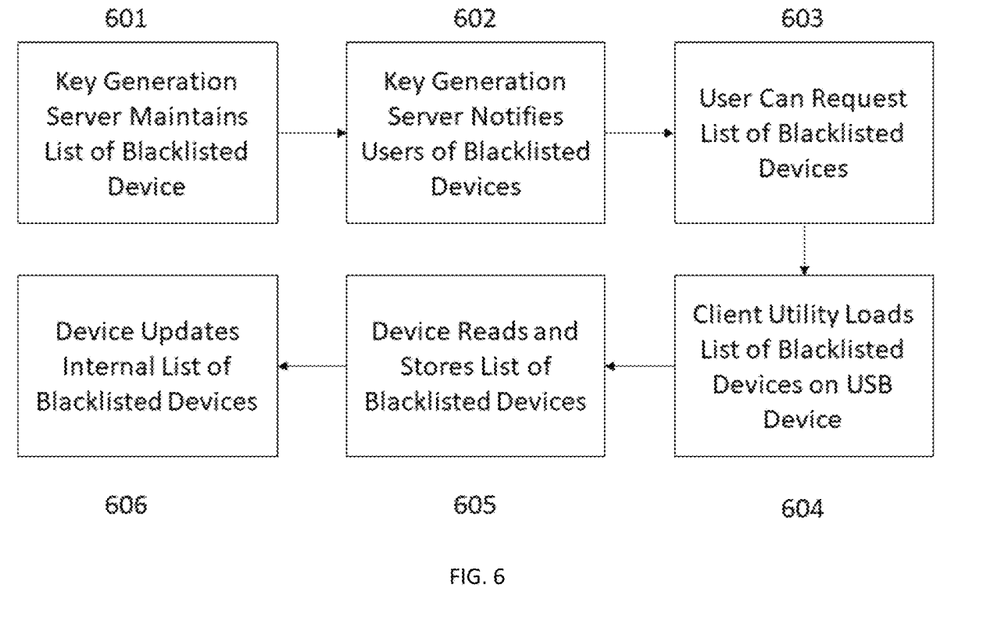
FIG. 6 is a flow chart showing steps for maintaining a list of blacklisted USB based authentication devices.

As described, in certain embodiments the system can maintain a list of blacklisted USB devices. The device can refuse to grant access to a blacklisted USB device, even if the key file is proper. FIG. 6 is a flow chart showing steps for revoking access to a device from a USB device when the device is not connected to the internet. The revoked entities can be users, other devices, systems. The revocation is not limited to any specific user, device, software and/or hardware.

In step 601, the key generation server can maintain a list of blacklisted USB authentication devices. As described, USB authentication devices may be blacklisted if a user attempts to create a second authentication device. USB authentication devices may also be blacklisted for any other reason, such as revocation of rights of the user, suspected impermissible activity, or any other reason. In step 602, the key generation server can notify all users when a device is blacklisted, such as through email, Application Programming Interface (API), text, or any other suitable communication. Step 602 may be performed by the key generation server in an automated fashion. The key generation server may be programmed to follow different rules for step 602. As a non-limiting example, the notification process may be based on geographical boundaries. Any user outside of the boundary will not be notified of a new blacklisted device. In step 603, the users can use the client utility or any other program to request a list of blacklisted devices from the key generation server. In step 604, the client utility can load a list of backlisted devices onto an external memory, such as a USB device. In certain embodiments, a USB device serving as the external memory in step 604 can itself be an authentication device. The list of blacklisted USB authentication devices list may be a listing of USB identification characteristics or can be the keys used by blacklisted devices. If the keys used by blacklisted devices are provided to the user, the key can be in the form of a list of hashed or encrypted values. If so, the devices implementing the access control mechanism should have knowledge of the hashing or encryption mechanism used. In step 605, the user can input the external memory into the device, which then reads the list of blacklisted devices. In step 606, the device can update an internal listing of blacklisted devices. When a user attempts to gain access to restricted modes of operation of the device using a blacklisted USB authentication device, the device can refuse access to the user.

Key File Algorithm

As described, the key generation server is programmed to receive one or more USB device identification characteristics. Using the USB device identification characteristics, the key generation server generates a key file, or alternatively a key. The key file or key can be transmitted back to the client computer for saving on the USB device. As described, the key generation server can generate the key file using USB identification characteristics such as the vendor ID, product ID, and serial number. However, other identification characteristics of the USB device can be used if those identification characteristics can be obtained by the client computer and are unique to a specific USB device. Because the vendor ID, product ID, and serial number form a unique combination for each USB device, each USB device will have a unique key file.

The key generation server can execute an algorithm on the USB device identification characteristics to generate the key file. For example, the key generation server can use a hash-based message authentication code (HMAC) to generate the key file. Other methods known in the art can also be used to generate a key file using the USB identification characteristics. Preferably, the key file will be small, less than 10 Kbytes. However, larger key files are possible. The algorithm used to generate the key file should be secret, known only to the key generation server and the device for which the key is intended.

In certain embodiment, the key file can be generated using offsets to increase security. As a non-limiting example of a key file, the key file can include four sets of values: i) a cryptographic hash of the vendor ID at a pre-determined offset from the start of the file; ii) a cryptographic hash of the product ID at a pre-determined offset from the start of the file; iii) a cryptographic hash of the serial number at a pre-determined offset from the start of the file; and iv) random numbers occupying the rest of the file. Because the identification characteristics are encrypted and begin at different parts in the file unknown to any users, with random values interspersed, discovery of the key is exceedingly difficult. Optionally additional USB identification characteristics can be used, as well as a secret value known by both the key generation server and the device. The secret can be an encrypted PIN, a password, a passphrase, or any other item not generally known or discoverable by a user.

Serial numbers are mandatory for USB mass storage devices, bulk only transport, but are optional for USB mass storage class CBI transport. If the algorithm used to generate the key file uses the USB device serial number, the client computer can first check whether a valid serial number is available prior to the start of the process.

The algorithm used to generate the key file are known to the key generation server and the device. The algorithm is opaque to the user. Because the contents of the key file are not part of any partition, the key file cannot be found by a normal user. Even if an advanced user checks all the memory locations of the USB device, the user will not be able to infer anything from the contents which include cryptographic hashes or encryption of the USB identification characteristics and random numbers.

One skilled in the art will understand that various combinations and/or modifications and variations can be made in the described systems and methods depending upon the specific needs for operation. Various aspects disclosed herein may be combined in different combinations than the combinations specifically presented in the description and accompanying drawings. Moreover, features illustrated or described as being part of an aspect of the disclosure may be used in the aspect of the disclosure, either alone or in combination, or follow a preferred arrangement of one or more of the described elements. Depending on the example, certain acts or events of any of the processes or methods described herein may be performed in a different sequence, may be added, merged, or left out altogether (e.g., certain described acts or events may not be necessary to carry out the techniques). In addition, while certain aspects of this disclosure are described as performed by a single module or unit for purposes of clarity, the techniques of this disclosure may be performed by a combination of units or modules associated with, for example, a device.

What is claimed is:

1. A method performed by a processor of a client computer, comprising the steps of:
   communicating one or more USB identification characteristics from a USB device in communication with the processor to a key generation server;
   receiving a unique USB key file from the key generation server by the processor;
      wherein the unique USB key file is generated using the USB identification characteristics;
      wherein the key generation server executes an algorithm to generate the unique USB key file from the USB identification characteristics;
   saving the unique USB key file on the USB device; and, when the USB device is in communication with the processor any subsequent time: communicating the one or more USB identification characteristics from the USB device to the key generation server; regenerating the same unique USB key file from the key generation server by the processor, wherein the same key file is generated using the same USB identification characteristics;
   comparing the same unique USB key file from the key generation server to the unique USB key file originally saved on the USB device; and
   authenticating the USB device if the unique USB key file from the key generation server matches the unique USB key file originally saved on the USB device.

2. The method of claim 1, wherein communication between the processor and the key generation server is through a secure channel.

3. The method of claim 1, wherein the USB identification characteristics comprise one or more of a vendor ID, a product ID, and a serial number of the USB device.

4. The method of claim 1, further comprising the steps of receiving a token from the USB device or a user, and only communicating the USB identification characteristics if the token is valid.

5. The method of claim 1, further comprising the steps of receiving user identification information, and communicating the user identification information to the key generation server; wherein the key generation server associates the user identification information with the USB identification characteristics.

6. The method of claim 1, further comprising the step of receiving blacklisted device information from the key generation server and determining whether the USB device is a blacklisted device.

7. The method of claim 6, wherein the processor will not authenticate a USB device if the USB device is a blacklisted device.

8. A system, comprising:
   a client computer comprising a processor programmed to communicate with a key generation server;
   the client computer comprising an input for a USB device;
      the processor programmed to:
         determine one or more USB identification characteristics from the USB device;
      communicate the one or more USB identification characteristic to the key generation server;
         receive a unique key file from the key generation server;
            wherein the key generation server executes an algorithm to generate the unique key file from the USB identification characteristics;
         save the unique key file on the USB device; and
      when the USB device is in communication with the processor a second time, the processor further programmed to:
         communicate the one or more USB identification characteristics from the USB device to the key generation server; regenerate the same unique key file from the key generation server, wherein the same key file is generated using the same USB identification characteristics; compare the regenerated unique key file from the key generation server to the unique key file originally saved on the USB device, and authenticate the USB device if the regenerated unique key file from the key generation server matches the key file originally saved on the USB device.

9. The system of claim 8, further comprising a medical device; the medical device comprising a processor programmed to authenticate the USB device by:
   determining the USB identification characteristics;
   executing an algorithm to generate a second key file;
   comparing the second key file to the key file stored on the USB device; and
   authenticating the USB device if the second key file and the key file stored on the USB device match.

10. The system of claim 9, wherein the processor of the medical device is programmed to grant access to a restricted mode of operation of the medical device if the USB device is authenticated.

11. The system of claim 8, wherein the USB identification characteristics comprise one or more of a vendor ID, a product ID and a serial number of the USB device.

12. The system of claim 8, wherein the processor of the client computer is programmed to receive user identification information, and communicate the user identification information to the key generation server.

13. The system of claim 9, wherein the processor of the medical device is programmed to receive blacklisted device information from the key generation server; and wherein the processor is programmed not to authenticate the USB device if the USB device is a blacklisted device.

14. A system, comprising:
a client computer comprising a processor programmed to communicate with a key generation server;
the client computer comprising an input for a USB device;
the processor of the client computer programmed to:
 i) determine one or more USB identification characteristics from the USB device;
 ii) communicate the one or more identification characteristic to the key generation server;
 iii) receive a unique USB key file from the key generation server; wherein the key generation server executes an algorithm to generate the unique USB key file from the USB identification characteristics; and
 iv) save the unique USB key file on the USB device;
wherein, when the USB device is in communication with the processor any subsequent time, the processor is programmed to:
 i) communicate the one or more USB identification characteristics from the USB device to the key generation server;
 ii) regenerate the same unique key file from the key generation server, wherein the same key file is generated using the same USB identification characteristics;
 iii) compare the regenerated unique key file from the key generation server to the unique key file originally saved on the USB device, and
 iv) authenticate the USB device if the regenerated unique USB key file from the key generation server matches the unique USB key file originally saved on the USB device.

15. The system of claim 14, further comprising a device; the device comprising a processor programmed to authenticate the USB device by:
decrypting the key file to generate one or more USB identification characteristics;
comparing the one or more USB identification characteristics generated by the device with the one or more USB identification characteristics from the USB device; and
authenticating the USB device if the one or more USB identification characteristics generated by the device match the one or more USB characteristics from the USB device.

16. The system of claim 15, wherein the processor of the device is programmed to grant access to a restricted mode of operation of the device if the USB device is authenticated.

17. The system of claim 14, wherein the USB identification characteristics comprise one or more of a vendor ID, a product ID and a serial number of the USB device.

18. The system of claim 14, wherein the processor of the client computer is programmed to receive user identification information, and communicate the user identification information to the key generation server.

* * * * *